(12) United States Patent
Berestov et al.

(10) Patent No.: US 8,077,205 B2
(45) Date of Patent: Dec. 13, 2011

(54) ADAPTIVE PREDICTION OF CALIBRATION PARAMETERS FOR COLOR IMAGING DEVICES

(75) Inventors: Alexander Berestov, San Jose, CA (US); Ted J. Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1216 days.

(21) Appl. No.: 11/818,795

(22) Filed: Jun. 14, 2007

(65) Prior Publication Data

US 2008/0309968 A1 Dec. 18, 2008

(51) Int. Cl.
*H04N 5/228* (2006.01)
*H04N 5/232* (2006.01)

(52) U.S. Cl. ............... 348/187; 348/180; 348/222.1; 348/241; 348/244

(58) Field of Classification Search ............ 348/187, 348/189, 180, 222.1, 223.1, 241, 243, 244, 348/249, 250
See application file for complete search history.

(56) References Cited

U.S. PATENT DOCUMENTS

| | | | |
|---|---|---|---|
| 5,668,596 A | 9/1997 | Vogel | 348/222 |
| 6,130,756 A | 10/2000 | Grady et al. | 358/1.1 |
| 6,184,925 B1 | 2/2001 | Abe et al. | |
| 6,734,896 B2 | 5/2004 | Nobori et al. | |
| 7,012,634 B2 | 3/2006 | Vogel et al. | |
| 7,235,773 B1 * | 6/2007 | Newman | 250/214 C |
| 7,411,549 B2 * | 8/2008 | Krumm et al. | 342/451 |
| 7,782,367 B2 * | 8/2010 | Berestov et al. | 348/222.1 |
| 7,847,822 B2 * | 12/2010 | Berestov et al. | 348/187 |
| 2003/0007077 A1 | 1/2003 | Maggi | |
| 2003/0081214 A1 | 5/2003 | Mestha et al. | 356/402 |
| 2003/0233589 A1 | 12/2003 | Alvarez | |
| 2005/0275911 A1 | 12/2005 | Yamada et al. | 358/518 |
| 2006/0142965 A1 | 6/2006 | Minor | |
| 2007/0177032 A1 | 8/2007 | Wong | |
| 2008/0170228 A1 | 7/2008 | Jiang | |

FOREIGN PATENT DOCUMENTS

EP 1367815 A2 3/2003

* cited by examiner

*Primary Examiner* — Jefferey Harold
*Assistant Examiner* — Jean W Desir
(74) *Attorney, Agent, or Firm* — Haverstock & Owens LLP

(57) ABSTRACT

A method of and system for calibrating an imaging device is described herein. An iterative method that attempts to find the best calibration parameters conditional upon an error metric is used. Regression is used to estimate values in a color space where the calibration is performed based upon a training data set. More calculation steps are required than would be for a regression in raw RGB space, but the convergence is faster in the color space where the calibration is performed, and the advantages using boundary conditions in the color space is able to provide improved calibration.

31 Claims, 5 Drawing Sheets

ADAPTIVE PREDICTION OF CALIBRATION PARAMETERS FOR COLOR IMAGING DEVICES

FIELD OF THE INVENTION

The present invention relates to the field of digital devices. More specifically, the present invention relates to calibrating digital devices.

BACKGROUND OF THE INVENTION

A digital still camera (DSC) or video camera (camcorder) has a sensor that is covered by a color filter array (CFA) to create pixel locations. A DSC typically uses red, green and blue (RGB) filters to create their image. Most current camcorders typically use cyan, magenta, yellow and green (CMYG) filters for the same purpose.

A conventional sensor is a charge-coupled device (CCD) or complimentary metal oxide semiconductor (CMOS). An imaging system focuses a scene onto the sensor and electrical signals are generated that correspond to the scene colors that get passed through the colored filters. Electronic circuits amplify and condition these electrical signals for each pixel location and then digitize them. Algorithms in the camera then process these digital signals and perform a number of operations needed to convert the raw digital signals into a pleasing color image that can be shown on a color display or sent to a color printer.

Each color camera has a unique sensor, CFA, and analog electronics system. The sensor and CFA have part-to-part variations. Accordingly, the electronic system needs to be calibrated for each camera. The goal is to make a "real world" scene captured with different cameras look the same when rendered on a display device. In order to calibrate an individual camera, the properties of the individual camera's primary color channels (CMYG for a camcorder; RGB for a DSC) need to be measured so that the individual camera's response to known colors can be quantized.

In the past, to calibrate a DSC, several pictures were taken with the DSC of objects with different colors. The more colors acquired, the better the calibration would be. The data from these pictures would then be transferred to a computer for analysis, and then parameters are adjusted within the DSC based on the analysis so that the DSC produces the best and most realistic colors. As described above, this was necessary because there are part to part differences in each camera such as there are slight variations in each sensor.

The main drawback of the previous systems which took multiple pictures is that they were slow. It takes time to take a number of pictures of different objects with different colors. It also takes time to transfer the data to a computer for analysis and calibration because typically the connection is slow.

SUMMARY OF THE INVENTION

A method of and system for calibrating an imaging device is described herein. An iterative method that attempts to find the best calibration parameters conditional upon an error metric is used. Regression is used to estimate values in a color space where the calibration is performed based upon a training data set. More calculation steps are required than would be for a regression in raw RGB space, but the convergence is faster in the color space where the calibration is performed, and the advantages using boundary conditions in the color space is able to provide improved calibration.

In one aspect, a computing device for calibrating an imaging device comprises a processor and an application for utilizing the processor for adaptively predicting a set of calibration parameters from an image and a training data set wherein the set of calibration parameters are used for calibrating the imaging device. The device further comprises a communication unit for communicating with the imaging device. The imaging device is selected from the group consisting of a digital camera and a digital camcorder. The computing device is selected from the group consisting of a personal computer, a server, a workstation, a PDA and a laptop. Preferably, the image is of more than one color. The computing device calibrates the imaging device. The computing device calibrates a sensor within the imaging device. Adaptively predicting a set of calibration parameters includes acquiring the training data set associated with a first set of colors and a second set of colors using a plurality of imaging devices, transforming the training data set from a first color space to a second color space using initial values of the calibration parameters, generating regression coefficients for predicting data associated with the second set of colors using the first set of colors, acquiring data associated with the first set of colors using the imaging device to be calibrated, transforming the data associated with the first set of colors from the first color space to the second color space using the initial values of the calibration parameters, predicting the data associated with the second set of colors using the regression coefficients, obtaining new calibration parameters from the acquired and predicted data and repeating the steps replacing the initial values with the new calibration parameters until a threshold is met. The regression coefficients are computed using a method selected from the group consisting of multiple regression, sequential regression from residues and pseudoinverse. The second color space is where calibration occurs. Preferably, the second color space is Vectorscope.

In another aspect, a camera calibration system comprises an imaging device for acquiring an image and a computing device coupled to the imaging device for storing a training data set and for adaptively predicting a set of calibration parameters from the image and the training data set wherein the set of calibration parameters are used for calibrating the imaging device. The imaging device is selected from the group consisting of a digital camera and a digital camcorder. The computing device is selected from the group consisting of a personal computer, a server, a workstation, a PDA and a laptop. Preferably, the image is of more than one color. The computing device calibrates the imaging device. The computing device calibrates a sensor within the imaging device. Adaptively predicting a set of calibration parameters includes acquiring the training data set associated with a first set of colors and a second set of colors using a plurality of imaging devices, transforming the training data set from a first color space to a second color space using initial values of the calibration parameters, generating regression coefficients for predicting data associated with the second set of colors using the first set of colors, acquiring data associated with the first set of colors using the imaging device to be calibrated, transforming the data associated with the first set of colors from the first color space to the second color space using the initial values of the calibration parameters, predicting the data associated with the second set of colors using the regression coefficients, obtaining new calibration parameters from the acquired and predicted data and repeating the steps replacing the initial values with the new calibration parameters until a threshold is met. The regression coefficients are computed using a method selected from the group consisting of multiple regression, sequential regression from residues and pseudoinverse. The second color space is where calibration occurs. Preferably, the second color space is Vectorscope.

In another aspect, a method of calibrating an imaging device comprises acquiring an image of more than one color with the imaging device, transferring the image to a computing device, adaptively predicting a set of calibration parameters from the image and a training data set and calibrating the imaging device using the set of calibration parameters. The imaging device is selected from the group consisting of a digital camera and a digital camcorder. The computing device is selected from the group consisting of a personal computer, a server, a workstation, a PDA and a laptop. Calibrating the imaging device includes calibrating a sensor within the imaging device. Adaptively predicting a set of calibration parameters includes acquiring the training data set associated with a first set of colors and a second set of colors using a plurality of imaging devices, transforming the training data set from a first color space to a second color space using initial values of the calibration parameters, generating regression coefficients for predicting data associated with the second set of colors using the first set of colors, acquiring data associated with the first set of colors using the imaging device to be calibrated, transforming the data associated with the first set of colors from the first color space to the second color space using the initial values of the calibration parameters, predicting the data associated with the second set of colors using the regression coefficients, obtaining new calibration parameters from the acquired and predicted data and repeating the steps replacing the initial values with the new calibration parameters until a threshold is met. The regression coefficients are computed using a method selected from the group consisting of multiple regression, sequential regression from residues and pseudo-inverse. The second color space is where calibration occurs. Preferably, the second color space is Vectorscope.

In yet another aspect, a method of generating a set of calibration parameters for an imaging device to be calibrated comprises acquiring a training data set associated with a first set of colors and a second set of colors using a plurality of imaging devices, transforming the training data set from a first color space to a second color space using initial values of the calibration parameters, generating regression coefficients for predicting data associated with the second set of colors using the first set of colors, acquiring data associated with the first set of colors using the imaging device to be calibrated, transforming the data associated with the first set of colors from the first color space to the second color space using the initial values of the calibration parameters, predicting the data associated with the second set of colors using the regression coefficients, obtaining new calibration parameters from the acquired and predicted data and repeating the steps replacing the initial values with the new calibration parameters until a threshold is met. The imaging device is selected from the group consisting of a digital camera and a digital camcorder. The computing device is selected from the group consisting of a personal computer, a server, a workstation, a PDA and a laptop. The second color space is where the calibration algorithm is run. Preferably, the second color space is Vectorscope.

DETAILED DESCRIPTION OF THE PREFERRED EMBODIMENT

Figure 1:
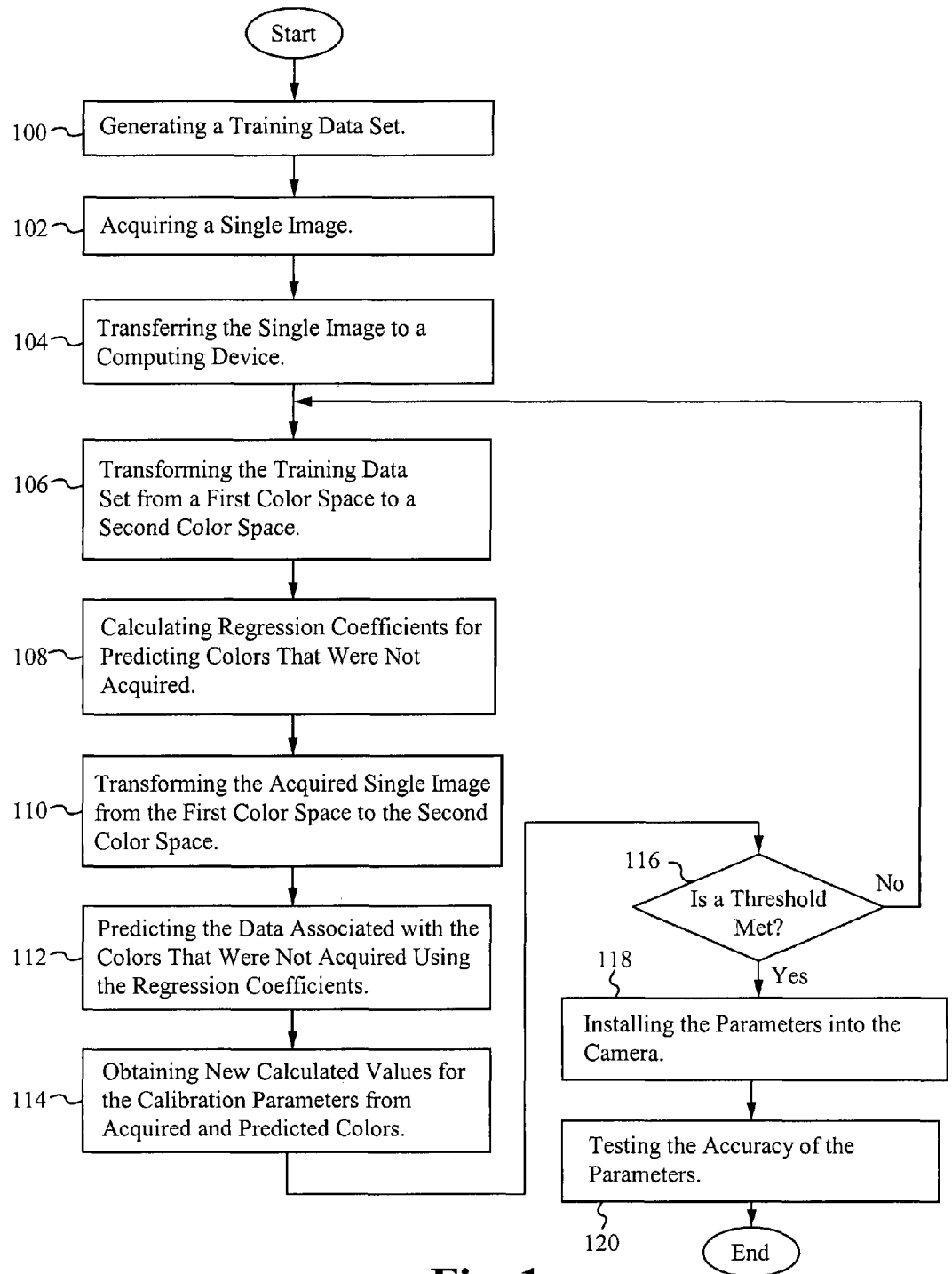
FIG. 1 illustrates a flowchart of a process of calibrating an imaging device.

In order for Digital Still Cameras (DSCs) and digital camcorders to function properly, their Charge-Coupled Device (CCD) or Complementary Metal-Oxide-Semiconductor (CMOS) sensor arrays have to be calibrated so that blue is blue, red is red and so on, in an image. Using a standard method of calibration, each imaging device is shown a collection of color bars in a calibrated color box or other images that have varying colors. The raw data outputs from the imaging devices are captured. By combining the results from the measured patches, calibration parameters are able to be generated which form the basis of imaging device calibration.

The calibration parameters are very sensitive to small differences that exist between individual imaging device sensors on the factory floor. Therefore, care is needed to accurately determine the calibration parameters.

A system for and method of computing calibration parameters using a form of linear regression that is computed in the non-linear color space in which the error metric used to evaluate the camera is computed is described herein. This non-linear space is commonly called Vectorscope space after the television monitor device from the 1950's era that is used to calibrate television cameras and monitors.

Vectorscope coordinates are labeled $C_r$ and $C_b$ for the x and y axes, respectively. Their relationship to the linear RGB measurements that come out of raw CCD and/or CMOS sensors comes from three equations. Non-linear R'G'B' is derived from the linear RGB by the gamma function shown in Equation 1.

$$[R'G'B'] = [R^{\gamma} G^{\gamma} B^{\gamma}] \tag{1}$$

These non-linear R'G'B' are then used to find the brightness or "luma" (Y') for each pixel using Equation 2. This is the standard definition for NTSC television.

$$Y' = 0.299 R' + 0.587 G' + 0.144 B' \tag{2}$$

Once the luma, Y', has been computed, two difference channels are defined in terms of the red and blue color differences with respect to Y'. $C_r$ and $C_b$ are the difference quantities defined in Equation 3.

$$C_b = B' - Y' \text{ and } C_r = R' - Y' \tag{3}$$

In Vectorscope space, the $C_r$ forms the x-axis and the $C_b$ forms the y-axis. The resulting color values from the color test patches are plotted on the screen, and the calibration process is essentially trying to change the calibration parameters until all of the patches are mapped as closely as possible to their target points (which are standard values for that camera type). In Vectorscope space, the brightness or luminance of the individual targets have largely been eliminated from the plot. What remains on the plot are the pure colors of the patches regardless of how bright the individual patches were. This greatly aids calibration since the variation in brightness of the individual camera sensors has been removed from the calibration process.

A special form for regression in the Vectorscope space (referred to as "beta" regression) is used so that only one image has to be acquired. Only having to make a single exposure for the individual cameras on the factory floor saves a significant amount of time, since thousands of cameras are produced and calibrated every day.

The calibration of a DSC or camcorder is a very critical element in the manufacture of a unit. Any color shift of standard memory colors (e.g. sky, grass, flesh tones) is instantly seen by the customer and would make the DSC or camcorder generally worthless. The primary colors from the camera CCD are taken and converted to a raw form of RGB (red, green and blue channels). A number of processing steps then take place to change the brightness of the scene (referred to as gamma processing), and then the image is converted to a new color space (YCrCb) including a brightness signal (designated by Y), and two chrominance channels (designated by Cr and Cb, respectively). The final calibration operation takes the Cr and Cb components of the image and enhances them to provide more vivid emphasis of the colors. This is done by modifying the Cr, Cb values. The resulting image is then ready to be displayed on a monitor, potentially, compressed to the same space, and then stored on some archival media.

The spectral sensitivity data out of the camera's CCD or CMOS sensor is able to either be raw CMYG or raw RGB.

To overcome the differences in the images that occur from the minor differences in the sensors, a camera processing algorithm performs sums and differences of the various raw data channels. After some normalization, what remains is a raw brightness channel (Y), and two chrominance channels (Cr and Cb, respectively). Typically, all knowledge of the original raw CCD color channels is lost at this point. All further processing only concerns the Y, Cr and Cb values, regardless of whether the original data started out as raw RGB or raw CMYG.

A camera processing algorithm transforms the Y, Cr and Cb values into a linear RGB set of values. The linear RGB values are not the same as the raw RGB values that came from the CCD. Once the linear RGB values are computed, then they are processed via the gamma curve processing for the brightness channel Y. Then, a white balancing step is performed to ensure that R=G=B=1 for a white patch. At this point, the RGB values are referred to as non-linear and white balanced.

The next step takes the non-linear and white balanced RGB and transforms them into Y', Cr' and Cb' values. The prime notation behind the variables denotes that these entities are non-linear and white balanced. The last major step is to take the Cr' and Cb' values, which represent the color in an image, and process them so that the image has more saturation and fidelity compared to real-life objects positioned beside a CRT monitor. Cr' and Cb' are transformed into Cr'' and Cb'', respectively. The double primes denote that the color channel has been enhanced to become more vivid.

Using the method described herein, only a single image is acquired to generate calibration parameters, unlike previous methods where multiple images were acquired. Furthermore, the regression of acquired information to predict calibration parameters takes place in a color space where the calibration takes place. This is contrasted with any other method that attempts to predict the parameters for color patches in the original raw RGB space or in the non-linear R'G'B' space. Because the current method performs the regression in the same color space as the calibration directly (rather than after a series of mathematical transforms), the resulting estimations are more accurate and permit the possibility of additional enhancements to meet specialized processing conditions required. As described above, the ability to predict the calibration parameters from a single image gives a tremendous time advantage by not having to set up all of the equipment needed to perform additional measurements.

FIG. 1 illustrates a flowchart of a process of calibrating an imaging device. In the step 100, a training data set is generated after capturing sets of data. For statistical accuracy, preferably 50 camera measurements or more are used to model the calibration parameters. The training data set is acquired separately from the other images acquired in later steps.

In the step 102, an imaging device to be calibrated acquires a single image. Preferably, the single image is of more than one color such as a color box. In the step 104, the single image is transferred to a computing device where calibration of the imaging device begins.

In the step 106, the training data set is transformed from a first color space into a second color space using the Equations 1, 2 and 3 above. The second color space is where calibration will occur. Initial values of calibration parameters are used in the initial transformation. For subsequent iterations, newly calculated values for the calibration parameters are used. In the step 108, information from the acquired single image and the training data set is used to calculate regression coefficients for predicting data associated with the colors that were not acquired. For example, if an entire set of colors is (M+N), and the imaging device acquires an image with M colors, then the data associated with the N colors is predicted. Furthermore, the regression coefficients are calculated by multiple regression, sequential regression from residues or pseudoinverse. In the step 110, the colors in the acquired information are transformed from the first color space to the second color space. Again, the initial values of the calibration parameters are used for this transformation. In subsequent iterations, the newly calculated values for the calibration parameters are used. In the step 112, the regression coefficients are used to predict the data associated with the colors that were not acquired. In the step 114, the acquired and predicted data associated with the colors are used to obtain new calculated values for calibration parameters and calibrate the imaging device. In the step 116, it is determined if the new calculated values have a difference between the previous values above a threshold. The threshold is such that if the new calculated values for the calibration parameters are not of a significant difference between the previous values, then there is no reason to perform another iteration. If the difference is above the threshold, then the process resumes at the step 106 with the new calculated values for the calibration parameters. Once sufficient calibration parameters are established, such that the difference is below the threshold, the calibration parameters are installed into the camera, in the step 118. Optionally, in the step 120, the accuracy of the final result is tested.

Sequential regression from residues is described in U.S. patent application Ser. No. 11/818,801 filed Jun. 14, 2007, entitled, "Sequential Regression for Camera Calibration from Residues," which is also incorporated by reference herein.

There are several advantages to using the "beta" method of regression to simulate a set of imaging data in a second color space. The primary advantage is that the calibration parameters are able to be computed by using a single acquired image. Multiple regression permits calibration on the factory floor by the determination of the calibration parameters from a matrix multiply of the regression coefficients and the Y, Cr and Cb values from the color boxes. A secondary advantage of the "beta" regression method is that the training data set is able to constantly be re-evaluated for the presence of "outlier" cameras that are only marginally good. By eliminating these cameras from the final training data set, better regression results are able to be obtained. Different cameras will become potential "outliers" for different calibration parameters. Thus, one cannot eliminate a single camera because at one particular set of calibration parameters it might be an "outlier". For a different set of calibration parameters, this same camera may be a perfectly good camera.

The same method that eliminates cameras from the training data set is also able to be used to identify a "single camera on the factory floor" as an "outlier" camera in need of special calibration or re-manufacture. If the searched on calibration parameters consistently show that this camera's second color space values are beyond a threshold away from the target points, then this "single camera on the factory floor" may not be capable of regular calibration in its current form.

Another advantage of the "beta" regression method in a color space where calibration occurs is that special boundary conditions are able to be placed on the "single camera's" color patches in the color space. The ability to use weighting values for various color patches is described above. The ability to reject cameras because the "first patch" has too much R'-Y' error (or similar conditions) is another boundary condition that helps identify problem cameras during calibration.

Figure 2:
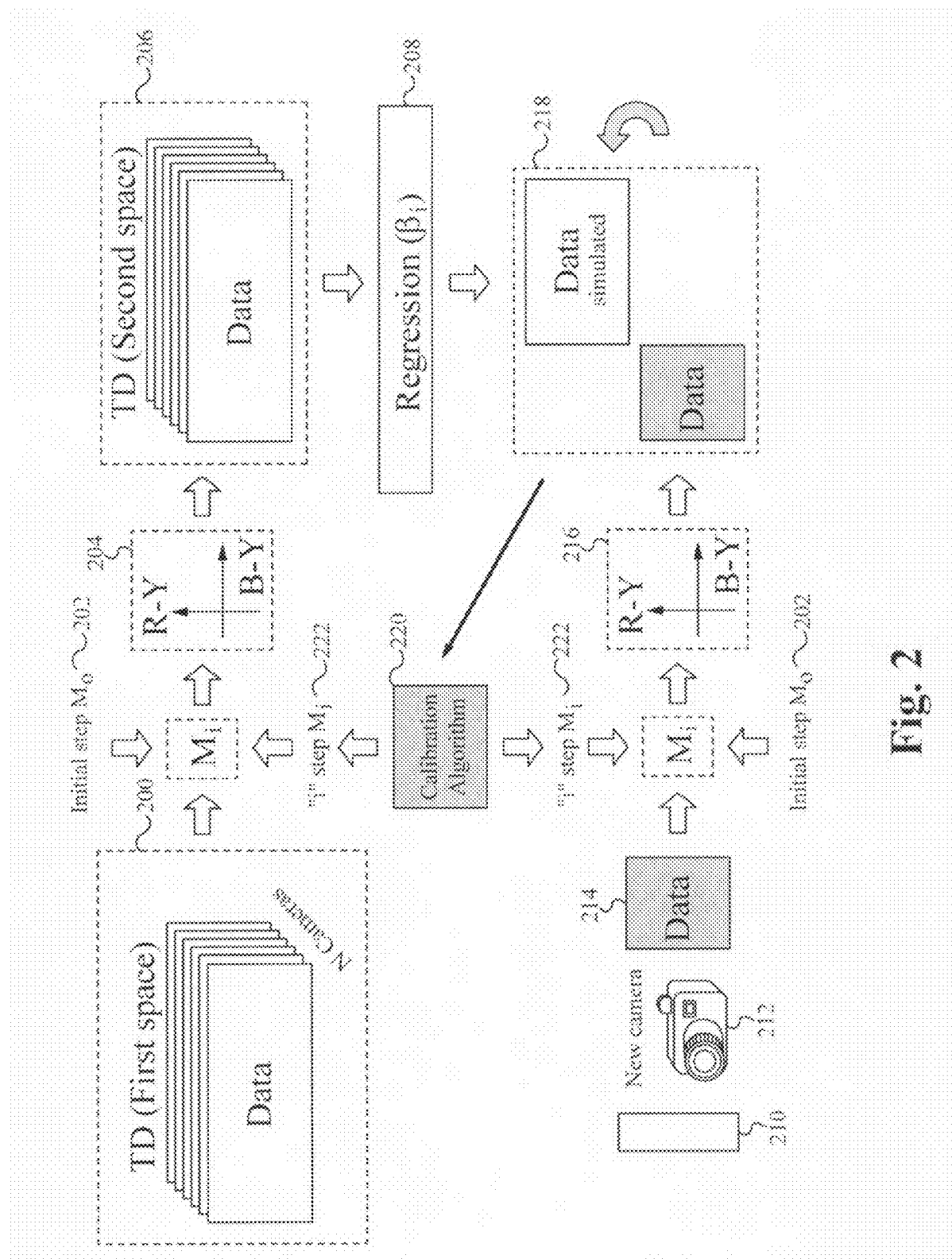
FIG. 2 illustrates a graphical flowchart of a process of calibrating an imaging device.

FIG. 2 illustrates a graphical flowchart of a process of calibrating an imaging device. A training data set 200 is in the RGB color space, where there are N data sets containing all of the colors. The training data set 200 is preferably acquired and generated previously. A set of initial values of calibration parameters $M_i$ 202 is then applied to the training data set 200 which converts the training data set 200 from the RGB color space to a second color space 204 where the calibration occurs. After converting the data into the second color space 204, there are N sets of data 206 in the second color space 204. A regression 208 is applied to the training data set 200 to generate a set of regression coefficients. The regression is able to be multiple regression, sequential regression from residues or pseudoinverse. The set of regression coefficients is represented as $\beta_i$.

An imaging device 212 to be calibrated acquires an image containing some of the colors in the training data set. The image information 214 is in the RGB color space, initially. Preferably an object 210 acquired in the image is more than one color. The image data is transferred to a computing device. The image data in the RGB color space is converted to data in a second color space by applying the set of initial values of calibration parameters $M_i$ 202.

The set of regression coefficients, $\beta_i$ is applied to the data for the image acquired. This gives a set of predicted data for the colors 218. The predicated data for the colors are for those colors not acquired by the imaging device 212. Together, the data associated with the imaging device 212 and the predicted data using the training data set 200 include all of the colors in the training data set 200.

Adjustments are made based on a comparison with this predicted data and the acquired image data to expected results for this camera. A calibration algorithm 220 is run using the predicted data and the acquired image data. A new set of values of calibration parameters $M_i$ 222 is determined based on the predicted data and the acquired data.

The process repeats until a threshold is met or until it is determined that the camera cannot be calibrated due to a defect. With each iterative process, instead of the initial values for the calibration parameters being used, the newly calculated calibration parameters are used to convert the training data set and the acquired image data into the second color space.

Figure 3:
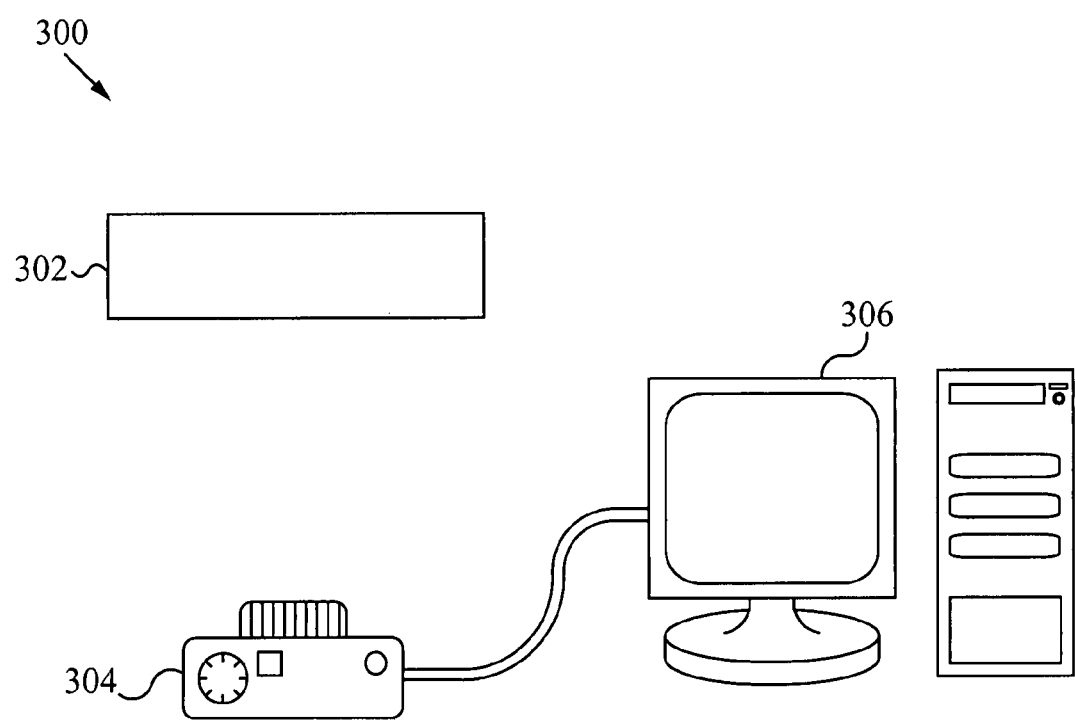
FIG. 3 illustrates a graphical representation of a calibration system.

FIG. 3 illustrates a graphical representation of a calibration system 300. The camera system 300 includes an object 302 to be acquired. Preferably, the object 302 is more than one color such as a color box with color patches. An imaging device 304 such as a digital camera or camcorder acquires an image of the object 302 where the image will be used to calibrate the imaging device 304. Components within the imaging device 304 such as a sensor are calibrated based on the image information acquired of the object 302. After the image is acquired by the imaging device 304, the image information is transferred to a computing device 306 to determine what modifications are needed, if any, to calibrate the imaging device 304. The imaging device 304 is able to transfer the image information to the computing device 306 either wirelessly or wired, depending on the desired configuration. Once the computing device 306 has the image information, the computing device 306 implements the method described above to adaptively predict the calibration parameters to calibrate the imaging device 304.

Preferably, generating the training data set occurs off of the production floor, so that processing of the imaging devices is able to occur smoothly and rapidly. Therefore, a separate station is used wherein many imaging devices acquire images, so that a computing device is able to generate the training data set. Then, the training data set is stored in computers on the production floor which are coupled to imaging devices that need to be calibrated. These imaging devices acquire only one image and use the training data set to adaptively predict the calibration parameters.

Figure 4:
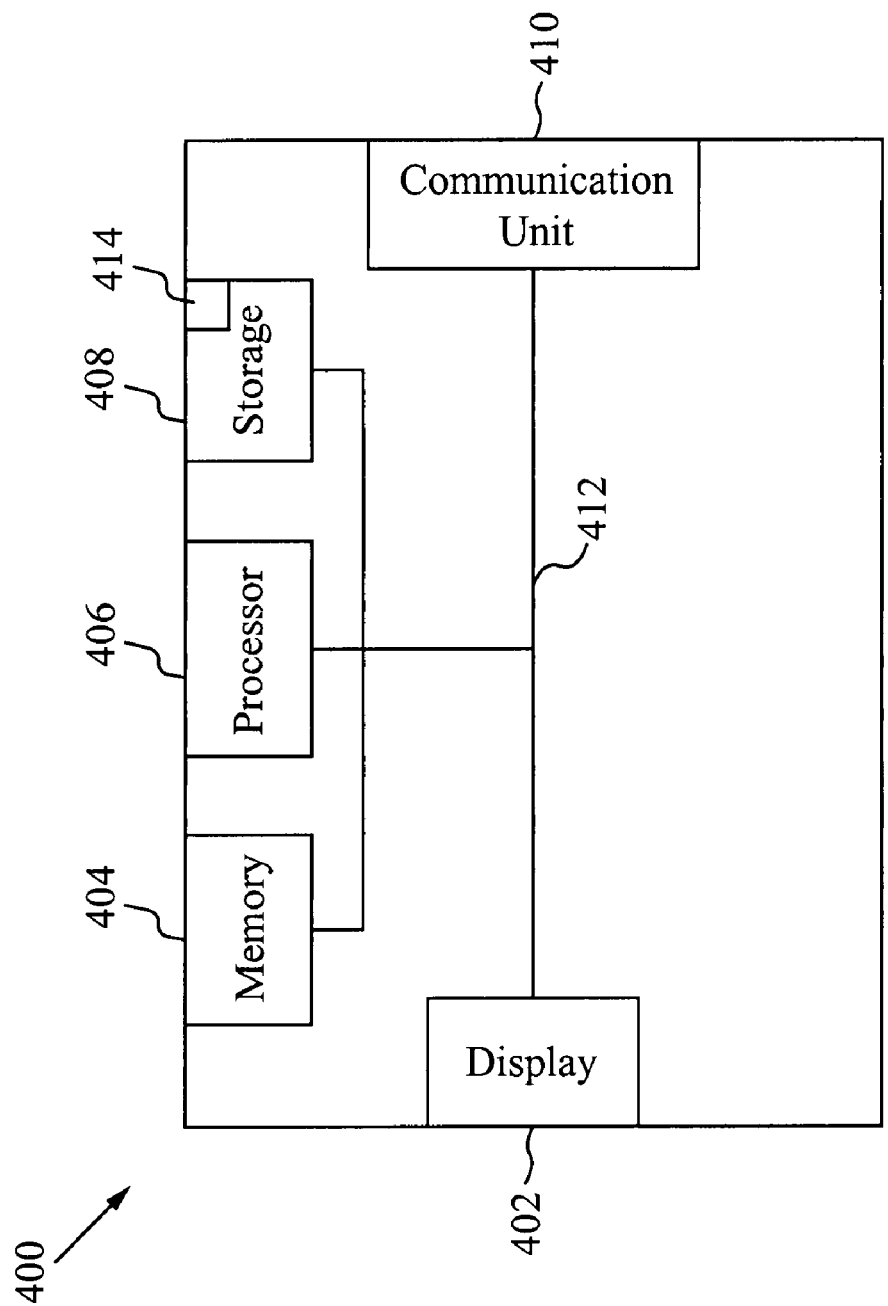
FIG. 4 illustrates a graphical representation of a computing device for calibrating an imaging device.

FIG. 4 illustrates a graphical representation of a computing device for calibrating an imaging device. A computing device 400 includes a number of elements: a display 402, a memory 404, a processor 406, a storage 408, a communication unit 410 and a bus 412 to couple the elements together. The communication unit 410 allows the imaging device to communicate with the computing device 400 such as to transfer acquired image information so the image information is processed by the processor 406 and temporarily stored on the memory 404 and more permanently on the storage 408. An application 414 stored within the storage 408 or at least with access to the processor 406 implements the method described herein to calibrate the imaging device. The display 402 displays information related to the application 414 in addition to other standard computing display information. The computing device 400 is able to be, but is not limited to, a personal computer, a server, a workstation, a PDA and a laptop.

Figure 5:
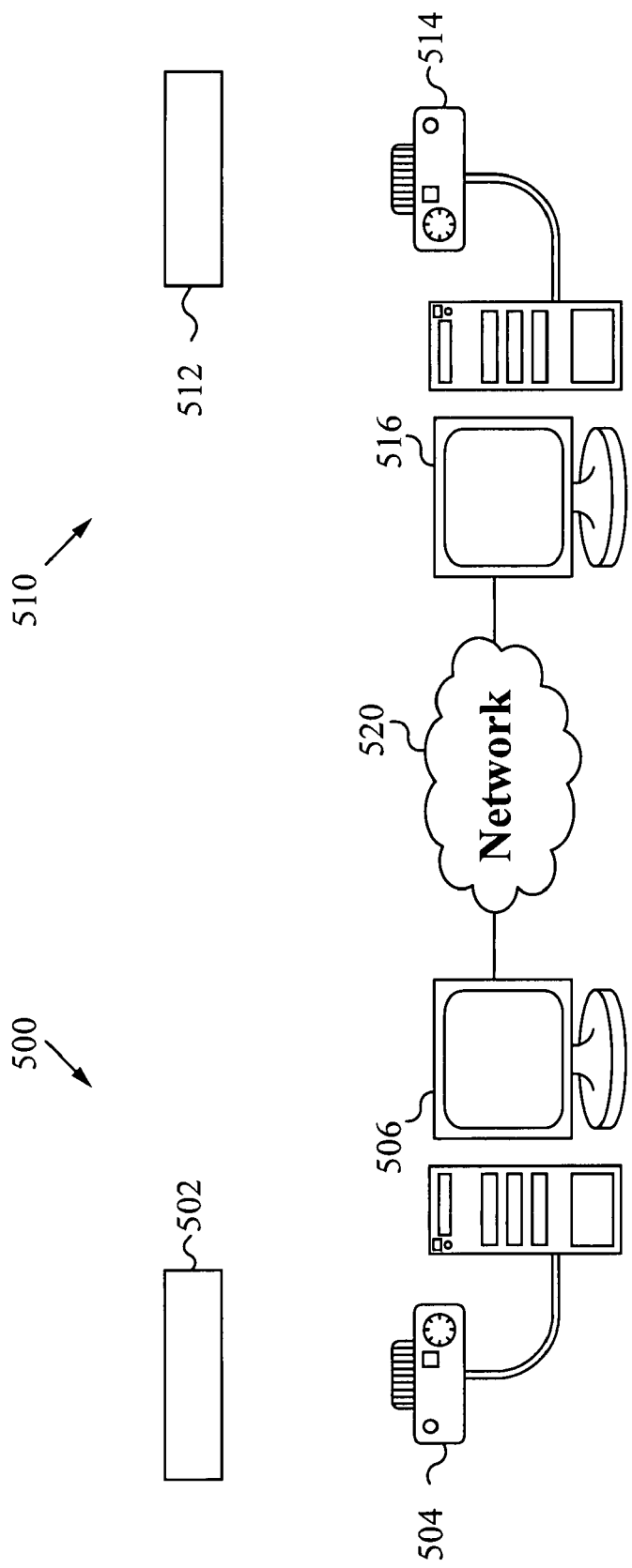
FIG. 5 illustrates a graphical representation of a network for calibrating imaging devices.

FIG. 5 illustrates a graphical representation of a network 520 for calibrating imaging devices. The network 520 is able to be any network, such as a local area network or a wide area network. Furthermore, the network is able to be wired, wireless or a combination of both. Coupled to the network 520 is a training system 500 which includes a training computing device 506 which receives information from a set of training cameras 504. The information includes an images of a variety of objects 502 such as color boxes. To acquire the information, each camera in the set of training cameras 504 takes a picture of the variety of objects 502. The training computing device 506 then uses a standard calibration algorithm to generate a training data set from the information acquired by the set of training cameras 504 as described above. Preferably, the training system 500 is not located on the production floor. Also coupled to the network 520 is a calibration system 510 which includes a calibrating computing device 516 and a camera 514 to be calibrated. The calibrating computing device 516 receives the training data set from the training computing device 506 and then utilizes the training data set to calibrate the camera 514 where the camera 514 only acquires one image of a color box 512, and an adaptive prediction of the calibration parameters is performed as described herein.

In another embodiment, the training system 500 and the calibration system 510 are coupled directly without a network.

To utilize the adaptive prediction system and method, a training data set is first generated. The training data set is generated by a computing device after one or more imaging devices acquire images. Then, with imaging devices that need to be calibrated, a single image is acquired. Each imaging device transfers the acquired image to the computing device which then uses the training data and the acquired image to adaptively predict calibration parameters which are used to calibrate the imaging devices. The adaptive prediction occurs in a color space where the calibration occurs. By adaptively predicting the calibration parameters, time is saved and accuracy of calibration is improved. Qualifying the training data within the method is a primary advantage. Using weighting values for various color patches also improves the calibration abilities.

In operation, the adaptive prediction system and method is able to calibrate many more imaging devices in a shorter amount of time than previous calibration mechanisms. Aside from acquiring a set of images to generate a training set of data with a first set of imaging devices, the other imaging devices only need to acquire one image. Thus, the time spent acquiring images is essentially halved because only one image is acquired for the bulk of the imaging devices. Also, the amount of data acquired is also essentially halved because only one image is acquired for the bulk of the imaging devices. With half as much data having to be transferred from the imaging devices to the computer, the amount of time spent on the transfer is also essentially halved. The computer has additional computations to make to adaptively predict the calibration parameters, but that amount of time is minimal compared to the time savings of approximately acquiring half as many images and transferring half as much data.

Additional devices are able to be calibrated using the method described herein such as television screens, computer monitors, other displays and printers.

The preferred color space which is the same color space where the calibration occurs is the Vectorscope color space. Other color spaces include Lab (perceptually uniform color space) and XYZ (CIE 1931 color space). However, any color space is able to be used wherein calibration occurs within that color space.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A computing device for calibrating an imaging device comprising:
   a. a processor; and
   b. an application for utilizing the processor for adaptively predicting a set of calibration parameters from an image and a training data set wherein the set of calibration parameters are used for calibrating the imaging device;
   wherein adaptively predicting a set of calibration parameters includes:
   i. acquiring the training data set associated with a first set of colors and a second set of colors using a plurality of imaging devices;
   ii. transforming the training data set from a first color space to a second color space using initial values of the calibration parameters;
   iii. generating regression coefficients for predicting data associated with the second set of colors using the first set of colors;
   iv. acquiring data associated with the first set of colors using the imaging device to be calibrated;
   v. transforming the data associated with the first set of colors from the first color space to the second color space using the initial values of the calibration parameters;
   vi. predicting the data associated with the second set of colors using the regression coefficients;
   vii. obtaining new calibration parameters from the acquired and predicted data; and
   viii. repeating ii, iii, v, vi, vii replacing the initial values with the new calibration parameters until a threshold is met.

2. The device as claimed in claim 1 further comprising a communication unit for communicating with the imaging device.

3. The device as claimed in claim 1 wherein the imaging device is selected from the group consisting of a digital camera and a digital camcorder.

4. The device as claimed in claim 1 wherein the computing device is selected from the group consisting of a personal computer, a server, a workstation, a PDA and a laptop.

5. The device as claimed in claim 1 wherein the image is more than one color.

6. The device as claimed in claim 1 wherein the computing device calibrates the imaging device.

7. The device as claimed in claim 1 wherein the computing device calibrates a sensor within the imaging device.

8. The device as claimed in claim 1 wherein the regression coefficients are computed using a method selected from the group consisting of multiple regression, sequential regression from residues and pseudoinverse.

9. The device as claimed in claim 1 wherein the second color space is where calibration occurs.

10. The device as claimed in claim 9 wherein the second color space is Vectorscope.

11. A camera calibration system comprising:
    a. an imaging device for acquiring an image; and
    b. a computing device coupled to the imaging device for storing a training data set and for adaptively predicting a set of calibration parameters from the image and the training data set wherein the set of calibration parameters are used for calibrating the imaging device;
    wherein adaptively predicting a set of calibration parameters includes:
    i. acquiring the training data set associated with a first set of colors and a second set of colors using a plurality of imaging devices;
    ii. transforming the training data set from a first color space to a second color space using initial values of the calibration parameters;
    iii. generating regression coefficients for predicting data associated with the second set of colors using the first set of colors;
    iv. acquiring data associated with the first set of colors using the imaging device to be calibrated;
    v. transforming the data associated with the first set of colors from the first color space to the second color space using the initial values of the calibration parameters;
    vi. predicting the data associated with the second set of colors using the regression coefficients;
    vii. obtaining new calibration parameters from the acquired and predicted data; and viii. repeating ii, iii, v, vi, vii replacing the initial values with the new calibration parameters until a threshold is met.

12. The system as claimed in claim 11 wherein the imaging device is selected from the group consisting of a digital camera and a digital camcorder.

13. The system as claimed in claim 11 wherein the computing device is selected from the group consisting of a personal computer, a server, a workstation, a PDA and a laptop.

14. The system as claimed in claim 11 wherein the image is more than one color.

15. The system as claimed in claim 11 wherein the computing device calibrates the imaging device.

16. The system as claimed in claim 11 wherein the computing device calibrates a sensor within the imaging device.

17. The system as claimed in claim 11 wherein the regression coefficients are computed using a method selected from the group consisting of multiple regression, sequential regression from residues and pseudoinverse.

18. The system as claimed in claim 11 wherein the second color space is where calibration occurs.

19. The system as claimed in claim 18 wherein the second color space is Vectorscope.

20. A method of calibrating an imaging device comprising:
   a. acquiring an image of more than one color with the imaging device;
   b. transferring the image to a computing device;
   c. adaptively predicting a set of calibration parameters from the image and a training data set; and
   d. calibrating the imaging device using the set of calibration parameters;
   wherein adaptively predicting a set of calibration parameters includes:
   i. acquiring the training data set associated with a first set of colors and a second set of colors using a plurality of imaging devices;
   ii. transforming the training data set from a first color space to a second color space using initial values of the calibration parameters;
   iii. generating regression coefficients for predicting data associated with the second set of colors using the first set of colors;
   iv. acquiring data associated with the first set of colors using the imaging device to be calibrated;
   v. transforming the data associated with the first set of colors from the first color space to the second color space using the initial values of the calibration parameters;
   vi. predicting the data associated with the second set of colors using the regression coefficients;
   vii. obtaining new calibration parameters from the acquired and predicted data; and
   viii. repeating ii, iii, v, vi, vii replacing the initial values with the new calibration parameters until a threshold is met.

21. The method as claimed in claim 20 wherein the imaging device is selected from the group consisting of a digital camera and a digital camcorder.

22. The method as claimed in claim 20 wherein the computing device is selected from the group consisting of a personal computer, a server, a workstation, a PDA and a laptop.

23. The method as claimed in claim 20 wherein calibrating the imaging device includes calibrating a sensor within the imaging device.

24. The method as claimed in claim 20 wherein the regression coefficients are computed using a method selected from the group consisting of multiple regression, sequential regression from residues and pseudoinverse.

25. The method as claimed in claim 20 wherein the second color space is where calibration occurs.

26. The method as claimed in claim 25 wherein the second color space is Vectorscope.

27. A method of generating a set of calibration parameters for an imaging device to be calibrated comprising:
   a. acquiring a training data set associated with a first set of colors and a second set of colors using a plurality of imaging devices;
   b. transforming the training data set from a first color space to a second color space using initial values of the calibration parameters;
   c. generating regression coefficients for predicting data associated with the second set of colors using the first set of colors;
   d. acquiring data associated with the first set of colors using the imaging device to be calibrated;
   e. transforming the data associated with the first set of colors from the first color space to the second color space using the initial values of the calibration parameters;
   f. predicting the data associated with the second set of colors using the regression coefficients;
   g. obtaining new calibration parameters from the acquired and predicted data; and
   h. repeating b, c, e, f, g replacing the initial values with the new calibration parameters until a threshold is met.

28. The method as claimed in claim 27 wherein the imaging device is selected from the group consisting of a digital camera and a digital camcorder.

29. The method as claimed in claim 27 wherein the computing device is selected from the group consisting of a personal computer, a server, a workstation, a PDA and a laptop.

30. The method as claimed in claim 27 wherein the second color space is where the calibration algorithm is run.

31. The method as claimed in claim 30 wherein the second color space is Vectorscope.

* * * * *